Figure 1:
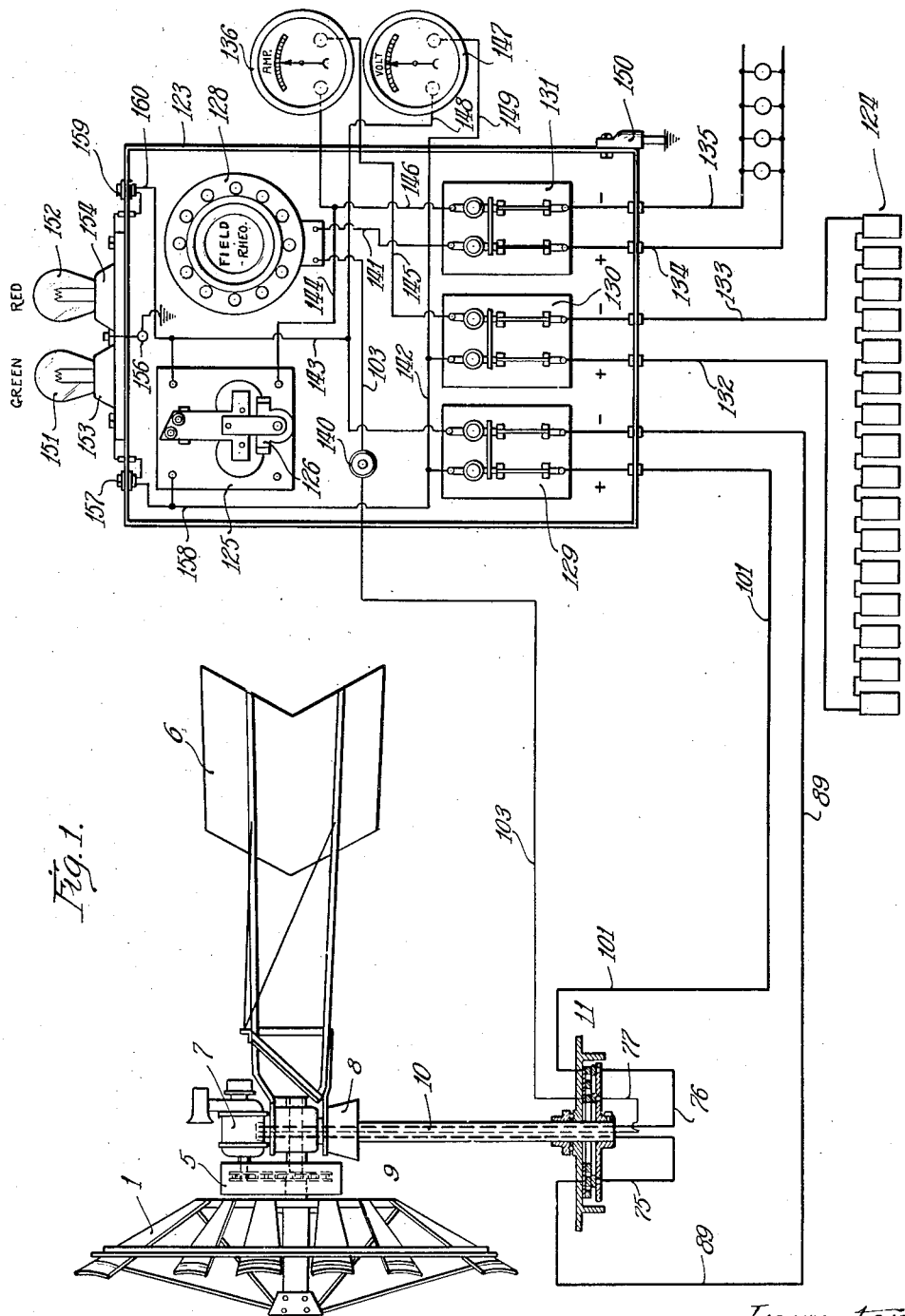

Sept. 8, 1931.                 H. E. BUCKLEN                 1,822,078
                              WIND DRIVEN GENERATOR
                           Filed Sept. 30, 1927      2 Sheets-Sheet 2

Fig. 2.

Inventor
Herbert E. Bucklen

Patented Sept. 8, 1931

1,822,078

UNITED STATES PATENT OFFICE

HERBERT E. BUCKLEN, OF ELKHART, INDIANA, ASSIGNOR TO HERBERT E. BUCKLEN CORPORATION, A CORPORATION OF INDIANA

WIND DRIVEN GENERATOR

Application filed September 30, 1927. Serial No. 222,991.

My invention relates to wind driven prime movers and more particularly to wind driven power plants for generating electric current. There are two general situations in which there is demand for wind driven power plants for generating electric current. First, remote stations where electric or other power is not available from commercial sources and expert attention is not available or is available at only infrequent intervals—second, where wind currents are strong and capable of producing considerable power relatively cheaply.

An instance of the former is found in lighting stations such as are required for beacons for aeroplane lanes and the like, or for light houses, buoys, or other markers. In such case the wind which is available may be relatively small in amount and fitfull in action, but constant attendance by a trained engineer, as would be required by a gas engine plant, is not economically feasible.

An instance of the latter class is in the Western or Prairie states where persistent strong winds are available over the greater part of the year and much power is available if suitable means is provided to develop the same.

In a power developing plant of this character no difficulty is encountered in generating current when the wind is strong and continuous. Any kind of a wind mill will work at that time. But, for a practicable plant to continue to operate successfully the year around, the wind motor must be capable of useful operation to generate current upon momentary rise of the wind velocity to the cut-in speed. In other words, the wind motor must pick up useful load for momentary gusts, where such gusts rise in velocity to a value of say from five to eight miles per hour.

According to my invention I am to keep the wind wheel in constant rotation, that is, spinning, even in a light breeze so that it is ready to respond to temporary increases of wind velocity to pick up useful load. To secure this desirable action, I mount the wheel upon a dead spindle through the medium of roller bearings so that it shall spin freely.

In conjunction with this I provide a relay or cut-out of great sensitiveness which will promptly cut in the generator connection to the battery when the voltage of the generator rises to a value high enough to pump current even in small quantities into the battery, and to disconnect the generator promptly upon drop of the voltage to substantially that of the battery. By this mode of operation I am able to accumulate sufficient power in the storage battery from the temporary increases of wind velocity to supply a farm lighting system even in relatively calm weather.

For localities where the wind is strong and persistent, the difficulty which is encountered is the generation of excessive current flow. For meeting this situation I provide in one form of my invention a remotely operating control member either to stop the wheel, as by a brake, or to set the wheel edgewise to the wind to stop the action of the generator. Such control, either manual or automatic, is particularly desirable to lighten the wind pressures in case of storm.

It sometimes occurs in a wind generating system of this character that the contacts on the sensitive cut-off relay become stuck or otherwise electrically connected together even when the voltage of the generator is insufficient to force charging current into the battery. Under these conditions, it becomes extremely desirable to provide some means for disconnecting the battery from the generator at this time. I accomplished this result by means of a switch placed in series with the positive generator leads and serving to disconnect the positive generator conductor from positive battery. However, if this is the only result accomplished by the operation of the switch, the field of the generator remains connected, and the generator may be burned out or considerable harm done to it by the excessive voltages generated, especially if a storm arises at this time. In order to obviate this difficulty, I connect the shunt field winding of the generator to this main switch also, so that when this switch is operated the generator field is deenergized, thereby eliminating any possible trouble that might arise from the functioning of the generator when the main switch is open. A protective relay is usually provided to perform this function automatically. However, it is always advisable to provide means in the switch for remotely controlling the operation of the generator so that it may be accomplished manually in time of trouble.

This application is a continuation in part of my application, Serial No. 78,274 filed December 30, 1925, issued as Patent No. 1,699,949, Jan. 22, 1929. In this prior application the features of my invention with respect to certain improvements in the generator have been disclosed. The present application is limited to the battery charging system proper and the control cabinet that is adapted to be associated with the generator disclosed in my prior application.

There are numerous other improvements which will be apparent from the following detailed description of certain embodiments of my invention.

Now, in order to acquaint those skilled in the art with one manner of constructing and operating a device embodying my invention, I shall describe in connection with the accompanying drawings certain specific embodiments of the same.

Figs. 1 and 2 show by means of the usual conventional diagram the circuits and apparatus for carrying out my invention.

As shown in Fig. 1 the generator of my invention comprises a wind wheel 1, which is shown of frusto conical shape, though, obviously, it may be of any desired shape and construction. The wind wheel 1 is suitably supported and adapted to operate the generator 7 which may be of any well known or desired construction as has been set forth in my previous mentioned application. The wind wheel 1 is adapted to be properly held into the wind by a tail vane 6, which may be of any well known or approved construction. The wind wheel 1, the generator 7 and the tail vane 6, together with the gear mechanism for connecting the wind wheel to the generator are suitably supported on a rotatable cap member 8 affixed to the top of the tower 9 (not shown).

The electric conductors leading from the generator 7 extend down a conduit 10 which serves the purpose, first of conducting the electrical conductors down to the umbrella 11, which contain suitable sliding contacts and collector rings, next a mechanical support having a radial bearing in the umbrella 11 to steady the head member 8 upon the top of the tower 9 and finally the conduit 10 serves as a ventilating duct for the generator 7 as has been set forth in my prior application, above mentioned.

The so-called umbrella 11 houses the rotary sliding contact by which connection is made with conductors 75, 76 and 77, which lead respectively from the negative terminals of the armature of the generator, the positive terminal of the armature of the generator, and the free terminal of the field winding of the generator. These sliding contacts or collector rings and their associated bushes may be of any suitable or approved construction to perform the function set forth.

The control panel 123 is preferably mounted at the base of the tower 5 (not shown and under suitable shelter). Adjacent the panel 123 I mount the storage battery 124 which, in the particular embodiment disclosed, comprises a 32 volt battery. Upon the control panel 123 I mount the cut-out or controlling relay 125, which closes the connection between the generator and the battery when the voltage of the generator rises to a predetermined value. This cut-out is of a particular character designed to operate on extremely close adjustment, so as to close its contact 126 very sharply upon the attainment of the desired voltage and to open the contact sharply upon decrease of the voltage below said cut-in point. As a result, substantially no current flows back from the battery 124 to spin the wheel 1, which has been the bugbear of systems of this class. This relay is shown in detail in the copending application of H. O. Putt, Serial No. 66,928, filed November 5, 1925.

The field wire 103 is connected to the positive side of the battery 124 through a variable field resistance 128, which control resistance is placed upon the panel 123 and its purpose is to govern the field to control the rate of charging the storage battery 124.

Suitable cut-out switches, as shown at 129, 130 and 131 are connected respectively in the generator leads 89 and 101 and in the battery leads 132 and 133 and the load or distributing leads 134 and 135. The negative battery lead 133 is cut through the ammeter 136 to indicate the input to or output from the storage battery 124. The generator leads, the battery leads, and the load leads are all provided with suitable fuses which are mounted adjacent the switches 129, 130 and 131, as will be apparent from the drawing. The field wire 103 contains the field fuse 140. The field wire 103 leads to one terminal of the field rheostat 128, the other terminal of which is connected through wire 141 to the positive wire 142. The negative generator lead 89 continues through the switch 129 to wire 143 which is connected to one terminal of the cut-out or relay 125. The other terminal of the relay 125 is connected by wire 144 to the ammeter 136. The other side of the ammeter 136 is connected by wire 145 to the negative battery lead through switch 130. A tap is taken off of wire 144 in advance of the ammeter 136 and this tap 146 leads through switch 131 to the negative load lead 135.

The volt meter 147 is connected across the generator leads by wires 148 and 149 and this volt meter, therefore, indicates continuously the voltage of the generator 7.

I have provided a testing circuit to permit the attendant to ascertain whether the system is free of ground, and if not which side is grounded. The steel cabinet 123 is grounded, as indicated at 150. Two signal lamps 151 and 152 are mounted in sockets 153 and 154 upon the top of the cabinet 123. The center contacts of the sockets are connected through the grounded cabinet, as indicated at 156. The sleeve terminal of the lamp 151 is connected through a push button 157 to the wire 158, which is connected to the positive wire 142. The sleeve contact of the socket 154 is connected through a push button 159 to the negative generator lead 143 by wire 160. Hence, the operator is able by pushing on the button 157 or 159 to determine whether or not a ground exists on one side or the other of the generator leads, since the corresponding lamp will light if such a ground exists. For example, if a ground exists on the generator lead 89, which is the negative lead, and the lamp 151 lights up when the button 157 is pushed, the operator then knows that the voltage of the generator is included between the ground 156 and some point beyond the armature of the generator, namely, somewhere on the wire 89 or connected parts. Likewise, if the operator pushes on the button 159 and the lamp 152 lights up, he knows that the voltage of the generator is included between the ground 156 and a ground on the other side of the line 101. The resistance of the lamp is high enough to prevent any damage to the apparatus. Thus, the lamp 152, which is made red, indicates a positive ground, that is, a ground on the positive side, and the green lamp 151 indicates a ground on the negative side.

I shall now describe the operation of the battery charging system.

The wind wheel 1 is adapted to be operated on very light wind, for example, five to eight miles per hour to generate current usefully. It is desirable that the wheel 1 be arranged to spin readily and freely, so that advantage may be taken of temporary gusts of wind to accumulate electrical power in the storage battery. I find that it is highly desirable to permit a small amount of current to flow into the battery rather than to have the same charged by violent and intermittent current flow.

It will be assumed that the generator is charging the battery 124 and that a ground occurs on the positive generator means somewhere between the generator 7 and the box 123, if the push button 159 is closed the lamp 152 will light up indicating such ground. In order to determine at this time upon which circuit the ground has occurred, the generator switch 129 is opened while the button 159 is closed. Obviously, if the ground is on the generator means the lamps will go out when the switch 129 is opened.

Assume that the button 157 is depressed and the lamp 151 lights up. The switches 129, 130 and 131 may be opened in turn to discover on which circuit the line is grounded.

The degree of brilliancy denotes the character of the ground. If the lamp is lighted brightly there is a heavy ground, and if the lamp glows only dimly, there is relatively high resistance in the ground connection. The structural steel tower which supports the generator is to be suitably grounded. The lamps themselves may be tested by simultaneously depressing both push buttons, in which event, the lamps will be connected in series across the line and will light up if they are in working order.

Referring to Fig. 2, certain controlling mechanism is mounted within a suitable cabinet 210, Relay 206 is a protective relay, the mechanical construction of which is described in the copending application of Herbert E. Bucklen and Harlie O. Putt, Serial No. 197,866 filed June 10, 1927, now Patent Number 1,728,037 of September 10, 1929. The relay 207 is a reverse current cut-out relay. This relay, together with its circuit and operation is described in the copending application of Harlie O. Putt, Serial No. 66,928 filed November 5, 1925, now Patent 1,701,634 of February 12, 1929. A main switch 205 for controlling the connection of the generator 200 to the control mechanism together with the associated fuses, is shown in the lower left hand corner of the cabinet. The other fuse blocks are disposed adjacent to the switch in the bottom of the cabinet. An ammeter 208 and voltmeter 209 are of the usual construction. The wind driven generator 200 is diagrammatically shown, together with its slip rings 202, 203 and 204, which may be enclosed in the umbrella at the bottom of the tower. The field of this generator is diagrammatically shown at 201. The construction and general operation of this modified form of battery charging system is quite similar to the one previously described, except for certain protective features which will now be described.

It will be assumed that the battery charging system shown in Fig. 2 is applied to a 32 volt installation. In this case, the protective relay 206 is adjusted to close its contact 220 when the voltage of the generator 200 reaches 25 or 30 volts. The reverse current cut-out relay 207 in this instance is adjusted to close a charging circuit through it when the voltage of the generator 200 is between 40 and 45 volts. The protective relay 206 will be adjusted to open its contact upon falling generator voltage when the electromotive force equals about 15 volts. The reverse current cut-out relay 207 is adjusted to open its contact in the charging circuit when the voltage of the generator falls below 38 volts. By virtue of these margins of operation, as well as by reason of the mechanical construction, reverse current cut-out relay 207 is very much more sensitive than the protective relay 206.

It will be noted that the field 201 of the generator 200 is connected to the main switch 205 and through the winding of the protective relay 206; also that the positive battery circuit is taken to the contacts of the protective relay. The opening of the main switch 205 will thus deenergize the generator field 201. This is a highly important provision since in the event of trouble, the main switch may be manually opened. The generator field is thus deenergized and the generator is also disconnected from the battery. The deenergization of the generator field prevents excessive voltages being formed in the generator, which would arise in the event of a storm during which the wind driven generator 200 would be operated at high speed. The disconnection of the battery from the generator prevents the discharge of the battery through the generator with its consequent possibilities of burning out the generator winding. The fuses which are connected in series from the main switch ordinarily will automatically perform the same functions as performed by the switch. That is, upon excessive voltage being generated in the generator 200, by reason of a storm or high wind, if this is permitted to occur, the fuses in series with the main switch will be blown and the same results obtained as before. The disconnection of the battery is an incidental result brought about by the deenergization of the relay 206 whose circuit is completed in series with that of the field winding of the generator. The relay 206 automatically brings about the connection and disconnection of the battery to the charging circuit upon the voltage limits above mentioned as will be explained.

When the voltage of the generator 200 reaches 25 or 30 volts, the protective relay 206, which is connected in series with the shunt field winding 201 of the generator 200, is energized over a circuit which extends from the negative terminal of the generator 200, shunt field winding 201, slip ring 202 and its associated brush to the right hand blade of the main switch 205, and its associated fuse, protective relay winding 206, fuse and other blade of the main switch, brush and slip ring collectors or rings 204 to the positive terminal of the generator 200. The positive terminal of the generator 200 is normally disconnected from the positive terminal of the battery until the protective relay 206 is operated whereupon this connection is made at its contact 220. Consequently, it will be seen that regardless of whether the contacts of the reverse current cut-out relay 207 are closed or not, there can be no possibility of current flow from the battery, discharging through the generator and the windings of the reverse current cut-out relay 207 holding it closed, until the protective relay 206 is operated. The reverse current cut-out relay 207 is very susceptible to jars and vibration and this function of the protective relay 206 is highly important. When the electromotive force of the generator 200 reaches 40 to 45 volts, the reverse current cut-out relay 207 is operated to close the charging circuit. The construction and manner of operation of this relay is shown more particularly in the patent to Harlie O. Putt No. 1,701,634 to which reference may be had for further particulars. This circuit may be traced from the negative terminal of the generator 200, slip ring 203 and its associated brush, terminal 221 of the relay 207, through series winding 222, through the contacts of the reverse current relay 207 to the terminal 223, ammeter 208 to the negative side of the battery 224. Since the positive terminal of the generator 200 is connected with the positive pole of the battery 224 through the contacts 220 of the protective relay 206, the battery 224 will be charged over the circuit above traced.

Now, when the generator 200 is charging at relatively high rate, if the fuse connected in series with the shunt field 201 and the main switch 205, blows it will be seen that the circuit of the protective relay 206 is opened, and this relay is deenergized to disconnect the positive battery conductor from the positive terminal of the generator. Therefore, there is no possibility of the battery discharging through the contact and winding of the reverse current cut-out relay 207. This possibility rises from the fact that the reverse current cut-out relay 207 would be relatively slow in its operation and permit a circuit to be completed through the generator winding were it not for the provision of the relay 206. Similarly, should the brush associated with the shunt field slip ring 202 not make proper contact, there is the same possibility of trouble as before, but the relay 206 is deenergized under these conditions with the same results as discussed. In ordinary practice, the generator 200 is usually mounted close to the impeller and the battery mounted at some convenient place on the ground. Therefore, the generator connection has to be carried to the control panel and to the battery. Now, if the conductor connecting the slip ring 200 to the control board should blow down and open during a storm the relay 206 will again be deenergized to disconnect the positive terminal of the battery 224 from the positive pole of the generator 200. It will be seen that the main switch 205 opens at the shunt field circuit of the generator 200. This is done so that if the main generator circuit extending to the slip ring 203 and its associated brush should be opened either by throwing the switch 205 or by a breaking of the conductor leading from the brush associated with the slip ring conductor 203 to the switch, or at some other point, the circuit of the shunt field 201 is opened. This is to deenergize the generator field, and if it were not done, the generator voltage would build up to dangerous proportions through the shunt field and burn out the field winding. In addition, when the battery load is removed by the opening of the main switch 205 or by a break occurring in the main circuit, there is no speed control for the generator, and the impeller or propeller would race at a speed much greater than when under load with the same wind velocity, and an excessive voltage would be generated and impressed upon the field winding. Since the field winding 201 is deenergized whenever the main switch is opened, no trouble of this nature can occur.

It will be observed that if any break occurs in the shunt field circuit, the relay 206 is deenergized to open the connection between the positive terminal of the generator and the positive pole of the battery. The collapse of the magnetic field generated by the relay 206 takes place in approximately the same time as the collapse of the field of the generator 200 and the contact 220 of the protective relay 206 are opened at the time when there is zero current value flowing through them. This provision insures that there is very little arcing at the contact 220 of the protective relay. The opening of the contact 220 occurs at this zero current value and an instant preceding, a reverse current discharge through the reverse current cut-out relay and the generator.

By the connection of the protective relay 206 in the circuit as described, it is possible to employ a fuse in the shunt field circuit that is just above the capacity of the field 201. Were it not for this protective relay, it would be necessary to place a fuse of much higher current carrying capacity in the shunt field circuit in order to prevent the fuse blowing when the battery is being charged at a relatively high rate. This would permit a reverse discharge from the battery through the generator as previously set forth. However, by the provision of the protective relay 206 and the lower current carrying capacity through the shunt field circuit, if the main generator circuit charging wires are opened at any point, if a connection on the battery should be opened or the main circuit opened in the control box when the generator is charging at a comparatively high rate, the elimination of the load on the generator would permit it to speed up and raise the voltage of the shunt field and force sufficient current through it to rupture the fuse in the circuit. The rupturing of this fuse opens a circuit of protective relay 206 so that no reverse discharge may occur, and also opens the circuit of the field winding 201 so as to prevent it from being burned out. It is obvious that with the low capacity of the fuse in the shunt field circuit, it is necessary to provide the protective relay 206 in order to open up the connection between the positive terminal of the generator 200 and the positive terminal of the battery 224 in order to prevent the reverse current discharge that has been hereinbefore described.

The operation of the testing circuit which comprises the lamps 221 and 212 and the push buttons 213 and 214 are identically the same as has been before described. The system may be tested for ground on either the negative or positive leads by depressing the push buttons 213 or 214, respectively, when either of the lamps 211 or 212, respectively, will be lighted, depending upon which side of the system is grounded. The lamps 211 and 212 themselves may be tested by depressing both the push buttons 213 and 214 simultaneously when a circuit will be completed through them both in series.

I do not intend to be limited to the detail shown and described, as it is apparent that those skilled in the art will see ways of securing the advantages of my invention without adhering strictly to the details disclosed.

I claim:—

1. In a control system, the combination with a battery, a generator for charging said battery, a circuit extending from said generator to said battery, of a protective relay in said circuit responsive to a predetermined value of electromotive force, and a reverse current relay connected in said circuit responsive to a predetermined greater value of electromotive force in said circuit, said protective relay maintaining said charging circuit open irrespective of the operaton of said reverse current relay until a predetermined voltage is set up in said circuit.

2. In a control system, the combination with a battery, a generator for charging said battery provided with a shunt field winding, and a circuit connecting said generator and said battery, of a protective relay connected in series with the shunt field winding of said generator, and including means controlled by said relay for closing said circuit.

3. In a control system, the combination with a charging circuit including a battery, of a generator for charging said battery provided with a shunt field winding, a protective relay connected in series with the shunt field winding and including means controlled by said protective relay for closing said circuit when the shunt field winding circuit is closed and for opening said charging circuit when the shunt field winding circuit is opened.

4. In a control system, the combination with a battery, a generator for charging said battery, and a circuit connecting said battery and said generator, of a shunt field winding for said generator, a protective relay connected in circuit with said winding, and including means operative when an excessive voltage is generated by said generator for opening the circuit of said shunt field winding and means controlled by said relay operative responsive to the opening of the circuit.

In witness whereof, I hereunto subscribe my name this 28th day of September, 1927.

HERBERT E. BUCKLEN.